United States Patent [19]

Secor

[11] 4,363,491
[45] Dec. 14, 1982

[54] SHAFT SEAL ASSEMBLY

[75] Inventor: Vincent E. Secor, Port Ewen, N.Y.

[73] Assignee: Stavo Industries, Inc., Kingston, N.Y.

[21] Appl. No.: 217,793

[22] Filed: Dec. 18, 1980

[51] Int. Cl.³ .............................................. F16J 15/34
[52] U.S. Cl. ..................................... 277/81 R; 277/96
[58] Field of Search ...................... 277/96 R, 81 R, 93, 277/93 SD

[56] References Cited

U.S. PATENT DOCUMENTS 3,081,099  3/1963  Walker et al. ..................... 277/81 R
3,410,566  11/1968  Wiese ................................ 277/81 R
3,822,066  7/1974  Keys ................................. 277/96 R Primary Examiner—Robert I. Smith
Attorney, Agent, or Firm—Harvey B. Jacobson

[57] ABSTRACT

A stainless steel sleeve is loosely disposed on a shaft portion projecting outwardly from a stuffing box bore and at least one end of the sleeve projects into the stuffing box bore and includes a seal member for establishing a sliding fluid-tight seal between the stuffing box bore and the sleeve. The sleeve is supported from the stuffing box for axial shifting relative thereto, but is keyed to the stuffing box against rotation relative thereto. A second sleeve component constructed of carbon/graphite is mounted on the shaft portion outwardly of the stainless steel sleeve and includes seal structure forming a fluid-tight seal between the shaft portion and the second sleeve. The opposing axial ends of the stainless steel and second sleeve include end faces disposed in planes normal to the center axis of the shaft portion and in sliding engagement with each other. Spring structure is operatively connected between the stuffing box and the stainless steel sleeve and yieldingly biases the latter along the shaft portion toward and into frictional engagement with the adjacent end of the second sleeve.

5 Claims, 3 Drawing Figures

SHAFT SEAL ASSEMBLY

BACKGROUND OF THE INVENTION

Fluid pumps and other structures including outwardly projecting rotary shaft portions are in many instances provided with conventional stuffing box seals utilizing stuffing box packing, a packing gland and a stuffing box nut. While these stuffing box steel structures perform the desired sealing function in many cases with a high degree of reliability, in many instances the stuffing box nuts must be periodically adjusted in order to maintain the desired seal and in most instances a stuffing bos seal is adjusted to provide controlled leakage therepast for the purpose of providing for lubrication of the seal. Also, should a pump be utilized for pumping fluids which are abrasive or may have abrasive contaminants, stuffing box seals support reasonably rapid wear of associated shaft portions.

Accordingly, a need exists for an improved form of seal which will not require frequent checking and which will substantially eliminate shaft wear and leakage therepast.

BRIEF DESCRIPTION OF THE INVENTION

The seal assembly of the instant invention is constructed in a manner whereby it may replace a conventional packing box seal and includes a first sleeve which is supported within the packing box for axial shifting therein, but against rotation relative thereto and which loosely receives the associated shaft therethrough. The first sleeve supports an O-ring seal slidable relative to and establishing a fluid-tight seal between the first sleeve and the stuffing box and the seal assembly includes a second sleeve mounted on the shaft outwardly of the first sleeve and provided with seal structure establishing a fluid-tight seal between the second sleeve and the shaft. The second sleeve is provided with structure which locks the second sleeve to the shaft against axial displacement relative thereto and for rotation with the shaft. The adjacent ends of the first and second sleeves are provided with opposing end faces disposed normal to the longitudinal axis of the associated shaft and engaged in rotary frictional contact with each other. One of the adjacent sleeve ends is constructed of stainless steel and the other sleeve end is constructed of carbon/graphite material. In addition, spring structure is operatively associated between the stuffing box and the first sleeve and lightly yieldingly biases the first sleeve axially of the associated shaft into frictional engagement with the adjacent end of the second sleeve.

The main object of this invention is to provide a seal assembly which may be used effectively in many different types of pumps.

Another object of this invention is to provide a pump seal assembly which may also be used in other mechanisms including rotary shaft portions.

Still another object of this invention is to provide an improved seal which may be used as a ready replacement for a conventional packing box shaft seal.

A further object of this invention is to provide a pump shaft seal including structure which will prevent the scoring or wearing of an associated shaft in the event the pump is utilized to pump fluids having abrasive contaminants.

Yet another object of this invention is to provide an improved pump seal including a pair of relatively rotating components with one of the components being mounted against rotation relative to the associated stuffing box housing portion and the other of the components being mounted for rotation with the associated shaft and the relatively rotatable interface portions of the seal structure being defined between the two seal components.

A final object of this invention to be specifically enumerated herein is to provide an improved form of shaft seal in accordance with the preceding objects and which will conform to conventional forms of manufacture, be of simple construction and easy to use, so as to provide a device that will be economically feasible, long lasting and relatively trouble-free in operation These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
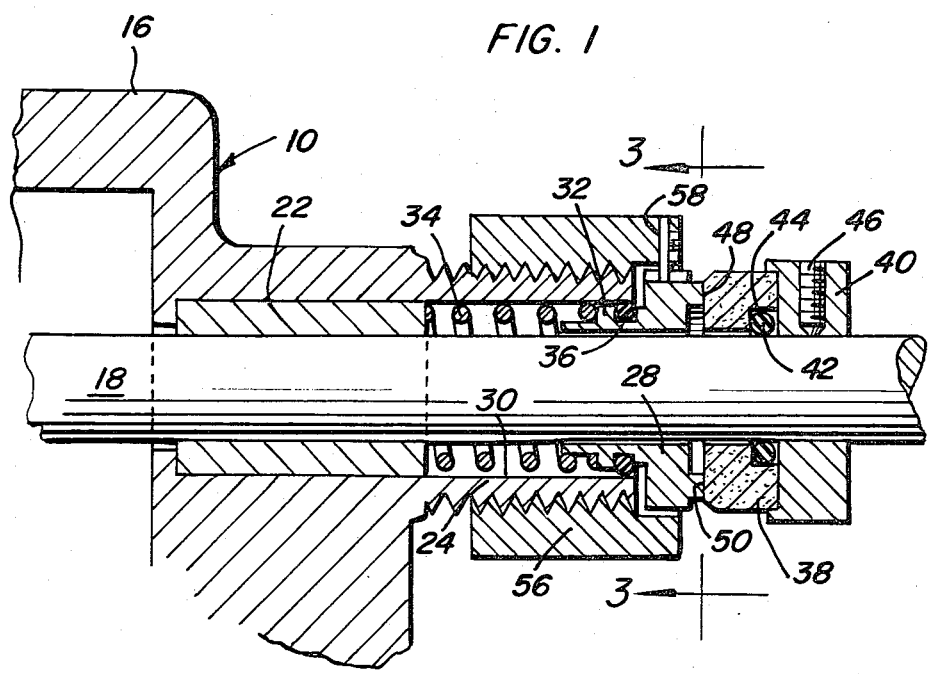
FIG. 1 is a fragmentary, vertical sectional view of a pump constructed to utilize a conventional stuffing box shaft seal, but which has been modified in accordance with the present invention.
Figure 2:
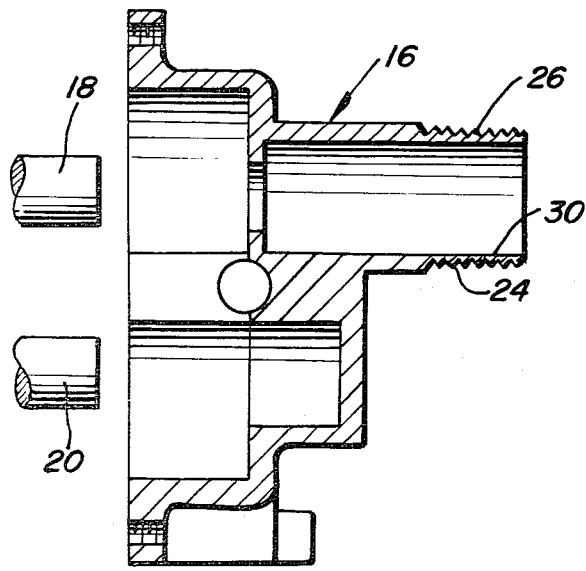
FIG. 2 is a fragmentary, exploded, vertical sectional view illustrating the housing portion defining the original stuffing box and the adjacent shaft end portions.
Figure 3:
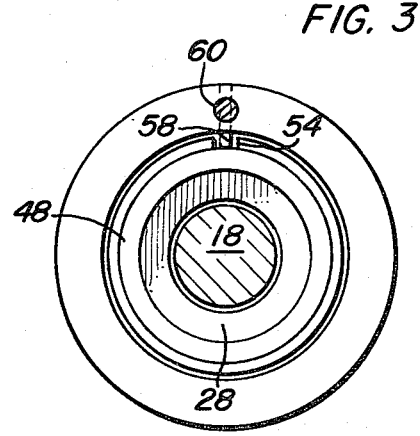
FIG. 3 is a vertical sectional view taken substantially upon the plane indicated by the section line 3—3 of FIG. 1.

Referring now more specifically to the drawings, the numeral 10 generally designates a rotary pump housing portion relative to which a pair of pump shafts 18 and 20 are journaled through the utilization of conventional bearings 22. The housing portion 16 defines a stuffing box 24 which is externally threaded as at 26 and through which the shaft 18 projects. Conventionally, a cylindrical stuffing box packing would be disposed about the shaft 18 outwardly of the bearing 22, a cylindrical packing gland would be disposed on the shaft 18 outwardly of the packing and a stuffing box nut would be threadedly engaged over the externally threaded portion 26 of the stuffing box 24 in order to form a fluid-tight seal between the shaft 18 and the housing portion 16.

However, with the instant invention the conventional packing box seal structure may be eliminated. The seal of the instant invention includes a first sleeve 28 disposed on the shaft 18 in position spaced outwardly of the bearing 22 and with the end of the sleeve 28 adjacent the bearing 22 projecting into the smooth bore 30 defined by the stuffing box 24. The end of the sleeve 28 projecting nto the bore 30 includes a diametrically enlarged circumferential rib 32 and a coiled compression spring 34 is loosely disposed about the shaft 18 between the outer end of the bearing 22 and the adjacent inner side of the rib 32. The sleeve 28 is loosely disposed on the shaft 18 and mounts an O-ring seal 36 thereon behind and outwardly of the rib 32, the seal 36 being axially slidably engaged with the smooth bore 30 defined by the stuffing box 24.

A second sleeve 38 is provided and is mounted on one axial end of a support sleeve 40. An O-ring 42 is seated in a counterbore 44 formed in the sleeve 38 at the end thereof opposing the support sleeve 40 and it will be noted that the support sleeve 40 is snugly disposed on the shaft 18 and includes a set screw 46 engaged with the shaft 18 securing the sleeve 40 as well as the sleeve 38 to the shaft 18 against axial displacement relative thereto and for rotation with the shaft 18, the sleeve 38 loosely receiving the shaft 18 therethrough. The opposing axial end faces 48 and 50 of the sleeves 28 and 38 are precision lapped and disposed normal to the longitudinal center line of the shaft 18 and the spring 34 yieldingly biases the sleeve 28 toward frictional engagement with the adjacent end of the sleeve 38.

The sleeve 28 includes an axially extending outer peripheral slot 54 formed therein and a cap nut or sleeve 56 is threaded on the external threads 26 of the stuffing box 24 and includes a radial pin 58 slidingly received within the slot 54 and removably supported from the cap nut 56 through the utilization of a set screw 60.

When installing the sleeve assembly, the cap nut 56 is first threaded on the stuffing box 24 until it "bottoms" against the housing portion 16. Thereafter, the spring 34 has one end thereof telescoped over the end of the sleeve 28 and both the spring 34 and the sleeve 28 are telescoped over the shaft 18 and into the positions thereof illustrated in FIG. 1 using a rotary motion when the O-ring 36 (previously mounted on the sleeve 28) enters the bore 30. The slot 54 is aligned with the pin 58 and the sleeve 28 is then shifted into final position. Thereafter, the assemblage comprising the sleeve 38 and the sleeve 40, after the set screw 46 has been backed off, is telescoped over the shaft 18 and into the position illustrated in FIG. 1 after which the set screw 46 is tightened. Of course, the end faces 48 and 50 of the sleeves 28 and 38 are carefully wiped in order to be cleaned of all foreign materials.

The sleeve 28 is constructed of stainless steel and the sleeve 38 is constructed of carbon/graphite. The term "carbon/graphite" is meant to denote any material having generally the same wear and anti-friction properties as "Metcar" No. 7700-R marketed by Metallized Carbon Corporation of Osing, N.Y. Further, although stainless steel has been used for the sleeve 28, it is to be noted that other materials compatible with "Metcar" or similar materials may be used.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a housing component defining a bore formed therethrough including an outer end portion opening outwardly of said housing component, said outer end portion of said bore defining an enlarged counterbore whose outer end opens outwardly through an outwardly projecting externally threaded stuffing box on said housing portion, a shaft including a first end portion projecting through said bore and counterbore, bearing means seated in said counterbore journalling said first end portion from said housing component, first sleeve means loosely telescoped over said first end portion and including first and second ends with at least said first end projecting into the outer end portion of said counterbore, first seal means establishing a fluid-type seal between said first end portion of said first sleeve means and said counterbore while allowing slight axial and angular displacement of said first sleeve means relative to said stuffing box, a keying sleeve threaded on said stuffing box, said keying sleeve and said first sleeve means including a radial pin and slot connection keying said first sleeve means to said stuffing box against rotation relative thereto while allowing axial shifting of said first sleeve means relative to said stuffing box, second sleeve means mounted on said first end portion of said shaft outwardly of said first sleeve means and including first and second ends corresponding to the first and second ends of said first sleeve means, said second and first ends of said first and second sleeve means including opposing end faces normal to the axial center lines of said sleeve means and disposed in sliding contacting relation, said second sleeve means being mounted on said first end portion of said shaft for rotation therewith and against axial shifting therealong, means operatively connected between said housing component and said first sleeve means yieldingly biasing the latter toward said first end of said second sleeve means, and second seal means establishing a fluid-type seal between said second sleeve means and said first end portion of said shaft.

2. The combination of claim 1 wherein one of said second and first ends of said first and second sleeve means is constructed of hard steel and the other of said second and first ends is constructed of carbon-graphite.

3. The combination of claim 1 wherein said second sleeve means is mounted on said shaft first end portion for axial shifting therealong and includes a set screw engaged with said shaft first end portion for releasably securing said second sleeve means on said shaft first end portion.

4. The combination of claim 3 wherein said means yieldably biasing said first sleeve means toward said second sleeve means includes a coiled compression spring disposed about said shaft first end portion and telescoped over said first end of said first sleeve means, whereby said spring functions to support said first sleeve means is concentric relation relative to said shaft first end portion.

5. The combination of claim 1 wherein said first sleeve means includes an outer peripheral axially extending slot formed therein and said keying sleeve includes generally radially inwardly projecting pin means projecting into and slidably received in said slot.

* * * * *